Feb. 9, 1937. A. LENNING 2,069,839
REFRIGERATION
Filed Jan. 16, 1934 2 Sheets-Sheet 1

INVENTOR
Alvar Lenning
BY
ATTORNEY

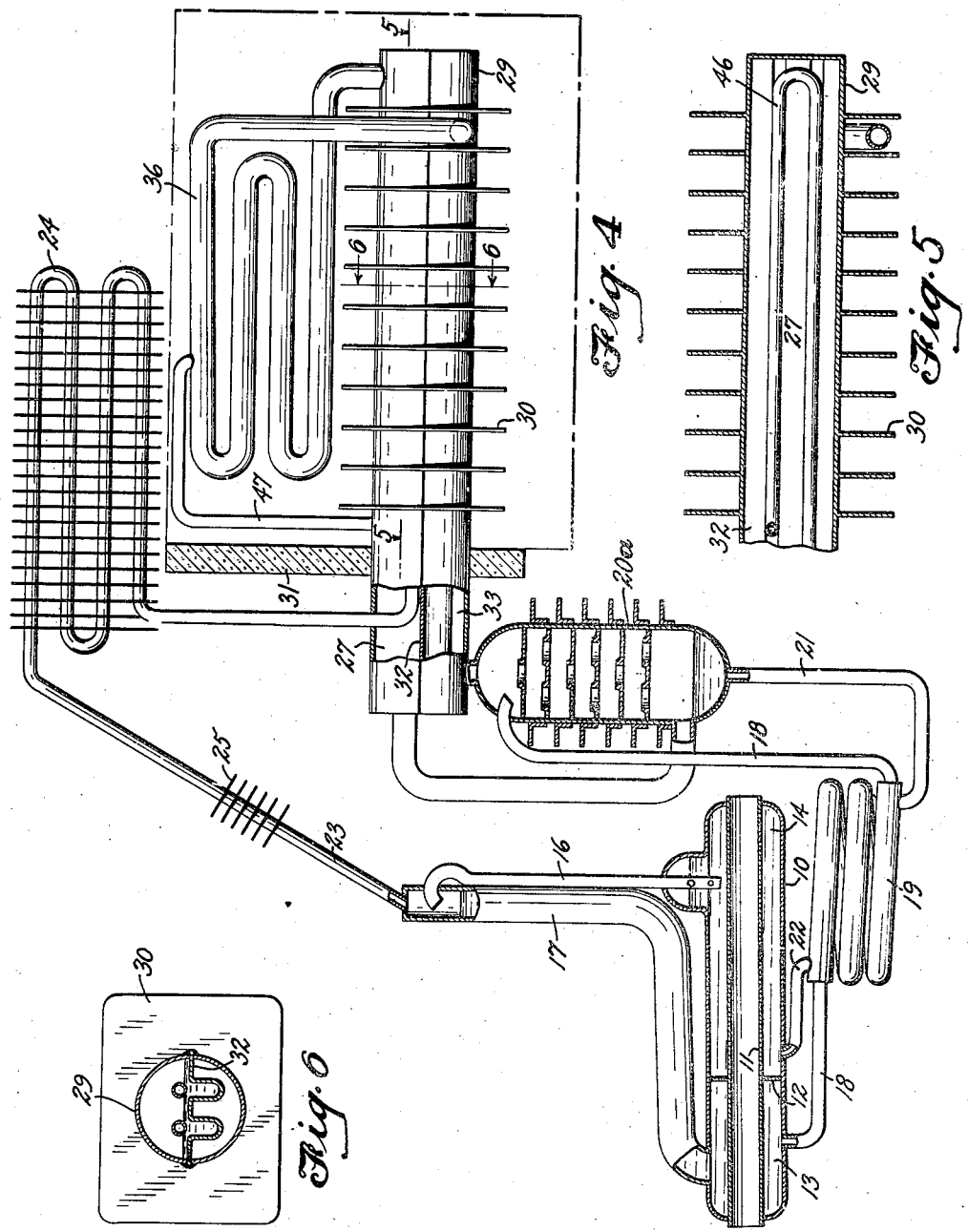

Patented Feb. 9, 1937

2,069,839

UNITED STATES PATENT OFFICE 2,069,839

REFRIGERATION

Alvar Lenning, Stockholm, Sweden, assignor, by mesne assignments, to Servel, Inc., Dover, Del., a corporation of Delaware Application January 16, 1934, Serial No. 706,804
In Germany January 31, 1933

12 Claims. (Cl. 62—126)

My invention relates to refrigerating systems of the kind employing a pressure equalizing gas into which refrigerant, such as ammonia, evaporates.

One object of my invention is to improve the efficiency of such apparatus. Another object is to provide improved apparatus for exchanging heat in such a system, and more specifically to improve heat exchange in the low temperature parts of the system.

The invention will be understood by reference to the accompanying drawings forming a part of this specification and of which:

Fig. 4 shows another embodiment of the invention;

Fig. 5 is a sectional view taken on the line 5—5 of Fig. 4; and

Fig. 6 is a sectional view taken on the line 6—6 of Fig. 4.

Figure 1:
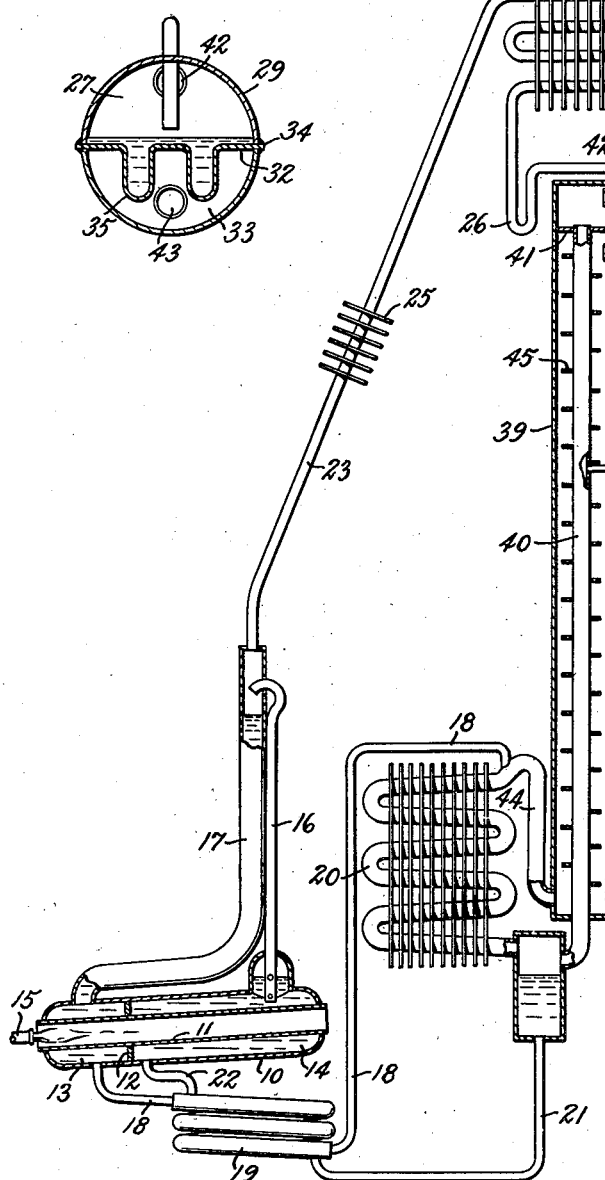
Fig. 1 is a more or less diagrammatical view of an absorption type refrigerating system embodying the invention.

The system disclosed in Fig. 1 is of the general type shown in United States Patent No. 1,609,334 granted December 7, 1926. The system is hermetically closed and operates due to the application of heat and includes a refrigerant such as ammonia, an absorption liquid such as water, and a pressure equalizing gas such as hydrogen. The generator 10 is a horizontal cylinder through which extends a flue 11 and which is divided by a partition 12 into a weak liquor chamber 13 and a strong liquor chamber 14. The generator may be heated by an electric heating element inserted in the flue 11 or by a gas burner 15 projecting a flame into the flue 11 or by any other suitable heating means.

A thermo-syphon element 16 lifts ammonia vapor and strong solution (that is, absorption liquid having a relatively large content of refrigerant absorbed therein) into the upper part of a stand pipe 17 which is connected to the weak liquor chamber 13. The chamber 13 communicates with a pipe 18 which extends through a pipe 19 and is connected to the top of an absorber 20. A pipe 21 connects the bottom of the absorber with the pipe 19 and a pipe 22 connects pipe 19 with chamber 14. There is a space between pipes 19 and 18 which is connected to the pipes 21 and 22. This provides the usual liquid heat exchanger for transfer of heat between weak liquor or absorption liquid flowing from the generator to the absorber and strong liquor flowing from the absorber to the generator.

Ammonia vapor generated in chambers 13 and 14 passes upwardly through pipes 17 and 16 respectively and through pipe 23 to a condenser 24 which may be cooled by water or by air. Fins 25 may be provided on the pipe 23 to provide cooling for rectification whereby entrained water vapor is condensed and caused to flow back to the generator. Other kinds of rectifier or analyzer may be used. The ammonia vapor liquefies in the condenser and flows through the seal 26 into the upper chamber 27 of a heat exchanger which forms a part of the evaporator designated generally by reference character 28. The heat exchanger may be in the form of a round tube 29 as shown, or the tube may be of other cross section, as square. Fins 30 are provided on the outside of the tube or heat exchanger 29 to provide extended heat transfer surface. This member 29 may also be termed a high temperature evaporator section. The fins 30 provide an extended surface for exchange of heat between the surrounding atmosphere or body to be cooled and the liquid refrigerant within chamber 27.

Figure 2:
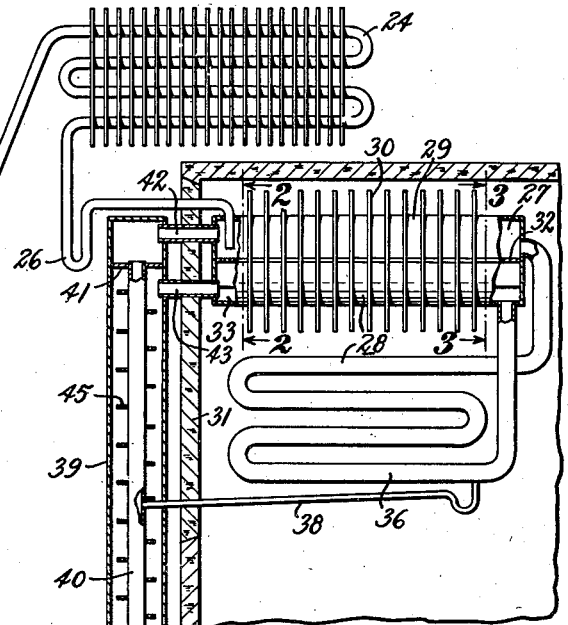
Fig. 2 is a cross sectional view taken on the line 2—2 of Fig. 1.
Figure 3:
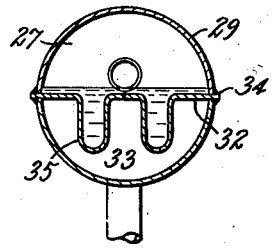
Fig. 3 is a cross sectional view taken on the line 3—3 of Fig. 1.

The member 29 is inside an insulated enclosure or refrigerator cabinet 31. A horizontal partition 32 separates the member 29 into an upper chamber 27 and a lower chamber 33. The high temperature evaporator section 29 may be formed as shown in Figs. 2 and 3 by using a longitudinally split tube and placing the plate 32 between the halves of the tube and welding longitudinal edges at 34 and suitably closing the ends. Welding is also provided in the ends so that the upper and lower chambers 27 and 33 are entirely hermetically sealed from each other. Plate 32 is formed with depending grooves or troughs 35 adapted to hold pools of liquid. These constitute depending pockets which extend into the low chamber 33.

Connected to the end of chamber 27 remote from the liquid inlet is a tube or pipe 36 which extends downwardly and again upwardly to connect with the lower chamber 33. The tube 36 is an ice freezing evaporator section. The tube may extend on the sides of a housing for ice trays and may be embedded in a metal structure so as to give good heat transfer between it and the ice trays. Means may be provided within the tubular member 36 to hold liquid therein in pools. Such means may consist of wire mesh or a spiral wire or perforated plates. Connected to the bottom of the pipe 36 is a drain tube 38.

Outside of the space or body to be cooled is a gas heat exchanger 39 comprising an outer tube and an inner tube 40. The inner tube is connected with the absorber 28 and passes through a partition 41 and communicates through tube 42 with the chamber 27 adjacent the liquid inlet thereto. A tube 43 connects the outside space of the gas heat exchanger with the lower chamber 33 of the high temperature evaporator section. A conduit 44 connects the bottom of the outside chamber of the gas heat exchanger with the top of the absorber 28. Baffling means 45 is provided within the gas heat exchanger to provide good heat transfer between the gas inside and outside the inner tube 40. The tube 38 is connected to the inside tube 40 of the gas heat exchanger.

Other devices and controls may be added to the system for increasing the efficiency of the system in general.

The system operates as follows:

Circulation between the generator and absorber is produced due to the action of the thermosyphon element 16. This element lifts liquid from chamber 14 to a higher level in pipe 17 than the connection of pipe 18 with the absorber, thus providing a head for flow by gravity of the liquid from the generator to the absorber. The liquid flows downwardly in pipe 17 through chamber 13, through pipe 18 and into the top of the absorber. Vapor is driven out in chamber 13 and passes in countercurrent to the downwardly flowing liquid in pipe 17. From the bottom of the absorber liquid flows through pipe 21, pipe 19, pipe 22 and upwardly through element 16 to pipe 17.

Liquid ammonia contained in the condenser flows into chamber 27 and rests on the upper surface of plate 32 and in the troughs formed by the depending portions 35. The conduit 36 is connected to chamber 27 above the top surface of plate 32 and acts as an overflow or a dam for maintaining a small height of liquid over the whole surface of the plate 32. Liquid flows from the liquid inlet end of chamber 27 longitudinally therethrough and into the pipe 36. In this flow, it evaporates by diffusing into the hydrogen or other inert gas. Rich gas, namely hydrogen having a large proportion of vaporous ammonia therein, flows through pipe 42 downwardly within pipe 40 to the bottom of the absorber and upwardly through the absorber where it meets the weak liquid admitted to the absorber from pipe 18. The absorber may be provided with means for delaying the flow of liquid therethrough. The absorber may be air cooled as shown, or may be cooled by other means to carry away the rejected heat of absorption. From the upper part of the absorber the hydrogen, deprived of a substantial proportion of ammonia gas and consequently constituting weak gas, flows through conduit 44 and upwardly within the outer space of the gas heat exchanger 39 and through pipe 43 into the lower chamber 33 of the high temperature evaporator section. It will be appreciated that the rich gas passing through the gas heat exchanger is cold whereas the gas in the outer chamber of the gas heat exchanger is relatively warm. The cold gas in the inside passage cools the warm gas in the outside passage of the gas heat exchanger.

The weak gas entering the chamber 33 is in direct contact with the bottom of the plate 32 and consequently is cooled by the liquid on plate 32, this liquid being reduced in temperature due to evaporation in chamber 27. Thus the lower chamber 33 is a pre-cooler for the gas entering pipe 36. The cooled gas flows downwardly through pipe 36 and upwardly through the loops thereof and enters the upper chamber 27. In its flow through pipe 36 it is in contact with liquid ammonia and evaporation takes place at very low temperature. Thus the weak gas is cooled in two stages, the first of which is in the outside gas heat exchanger at a relatively high temperature and the second of which takes place in the chamber 33 at lower temperature. Thus the gas is cooled to very low temperature when it enters the ice freezing section of the evaporator, thus permitting a low temperature and avoiding any heating for cooling off the gas in the ice freezing section. The use of the lower chamber 33 for pre-cooling the weak gas permits the use of a smaller gas heat exchanger than would be necessary without this chamber. Furthermore, a lower temperature can be obtained than if all the exchange of heat takes place outside the insulated enclosure. Any exchange of heat which is to take place at a temperature lower than the temperature of the food space advantageously is carried out within the food space. It is feasible to use the foregoing arrangement without the gas heat exchanger. In the coil 36 the hydrogen is saturated with ammonia to the extent permitted at the temperature prevailing and thereafter the gas and vaporous ammonia pass into the chamber 27 where further evaporation can take place due to the higher temperature. It will be seen that the construction of the member 29 forms a device for good heat transfer which is of simple construction and which provides gas tightness between the spaces on the opposite sides of the plate 32.

In the arrangement shown in Figs. 4, 5, and 6, the member 29 is situated below the coil 36. The weak gas passes from the absorber 28, which may be of the disc-containing type, as shown, into the space 33 on the under side of plate 32. Thence the gas passes upwardly to the top of the evaporator freezing section 36 and downwardly therethrough to the chamber 27. The outlet from the condenser 24 is formed as a loop 46 disposed within chamber 27 and disposed just above the troughs in the plate 32. The coil 46 is connected to a pipe 47 which is connected to the top of the evaporator section 36. In this embodiment, liquid ammonia flows from the condenser downwardly to the coil 46, through this loop, and upwardly through tube 47 and into the top loop of ice freezing section 36. This liquid refrigerant trickles downwardly within tube 36 and flows onto the plate 32. The inert gas likewise flows downwardly in tube 36. This flow is parallel, as distinct from counter-flow in Fig. 1. Since the member 29 is at relatively high temperature with respect to the coil 36, further evaporation takes place in chamber 27. The pipe or coil 46 is in contact with evaporating liquid ammonia in chamber 27 and thus the ammonia liquid entering the evaporator is cooled. The weak gas is cooled by the contact with the under side of the plate 32. The weak gas inlet end of chamber 33 is relatively warm and may be outside the insulated enclosure as shown. An additional gas heat exchanger may be used outside the insulated enclosure which may be a further extension of the member 29.

In each of the embodiments all flows are produced without moving parts, the flow of inert gas being produced by differences in specific weights of different vertically extending columns of fluid. It will be understood that the invention is not limited to the precise embodiments disclosed.

What I claim is:

1. In a refrigerating system employing a pressure equalizing gas, an evaporator having a low temperature ice freezing section and a high temperature section comprising a member having a horizontal partition dividing the same into an upper chamber and a lower chamber, the gas inlet to the ice freezing section being connected to said lower chamber, the gas outlet being connected to said upper chamber, means to supply liquid refrigerant to said upper chamber, means to withdraw rich gas from said upper chamber, and means to supply weak gas to said lower chamber.

2. In a refrigerating system employing a pressure equalizing gas, an evaporator having a low temperature ice freezing section and a high temperature section, means to conduct the equalizing gas first through the ice freezing section and thence through the high temperature section, means to supply liquid refrigerant to the high temperature section, the ice freezing section being connected to the high temperature section to receive liquid therefrom by gravity flow, and means to exchange heat between gas flowing to the ice freezing section and liquid in the high temperature section.

3. In a refrigerating system employing a pressure equalizing gas, an insulated enclosure, an evaporator in said enclosure having a low temperature section and a high temperature section, said high temperature section having separated spaces within the insulated enclosure, a gas heat exchanger outside said enclosure, an absorber, and means to conduct the pressure equalizing gas from the absorber to the gas heat exchanger, thence to one of said separated spaces, thence to the ice freezing section, thence to the other of said separated spaces, thence to said gas heat exchanger and back to the absorber, and means to supply liquid refrigerant to said space of the high temperature section receiving gas from the ice freezing section.

4. In a refrigerating system employing a pressure equalizing gas, means to maintain a pool of liquid refrigerant in heat exchange relation with the body to be cooled and in direct contact with rich gas, and means to conduct weak gas in indirect heat exchange relation with said pool, said pool maintaining means and said gas conducting means being so constructed and arranged that the pool is in at least as good heat transmitting relation with the body to be cooled as is the gas in the gas conducting means.

5. In a refrigerating system employing a pressure equalizing gas, a high temperature evaporator section having a trough adapted to hold liquid, means to supply liquid refrigerant to said trough, means to conduct rich gas above said trough, and means to conduct weak gas below said trough.

6. In a refrigerating system employing a pressure equalizing gas, a high temperature evaporator section exposed to the body to be cooled and having a trough adapted to hold liquid, means to supply liquid refrigerant to said trough, an ice freezing evaporator connected to receive overflow liquid from said trough, and means to conduct gas underneath said trough, thence through said ice freezing section and thence over said trough.

7. In a refrigerating system employing a pressure equalizing gas, a high temperature evaporator section exposed to the body to be cooled and having external extended surface and means for holding liquid therein, means to supply liquid refrigerant to said holding means, an ice freezing evaporator connected to receive overflow liquid from said holding means, and means to conduct gas in indirect heat transfer relation with said holding means, thence through said ice freezing section and hence in direct contact with liquid in said holding means.

8. In a device of the character described, a plate having a groove, separate shells on opposite sides of and secured to said plate, said plate dividing the aggregate into two spaces, an evaporator section connected between said spaces, members for conducting gas to and from the device, and a member for conducting liquid refrigerant thereto.

9. In a refrigerating system employing a pressure equalizing gas, an insulated enclosure, an ice freezing evaporator section in said enclosure, a gas heat exchanger outside said enclosure, a plurality of fins in said enclosure, conduits for weak and rich gas passing through said fins, and means to supply liquid refrigerant to the conduit for rich gas, said conduits being connected to said ice freezing evaporator section and said gas heat exchanger.

10. In a refrigerating system employing a pressure equalizing gas, an evaporator having a low temperature ice freezing section and a high temperature section, both said sections being in heat exchange relation with material to be cooled, means to conduct the equalizing gas in series first through the ice freezing section and then through the high temperature section, a condenser, means to conduct liquid from the condenser first in heat exchange relation with the high temperature section, then through the ice freezing section and then through the high temperature section, and means to exchange heat between gas flowing to the ice freezing section and liquid in the high temperature section.

11. In a refrigerating system employing a pressure equalizing gas, an evaporator having a low temperature ice freezing section and a high temperature section, means to conduct the equalizing gas in series first through the ice freezing section and then through the high temperature section, a condenser, means to conduct liquid from the condenser first in heat exchange relation with the high temperature section, then through the ice freezing section, and means to exchange heat between gas flowing to the ice freezing section and liquid in the high temperature section.

12. In a refrigerating system employing a pressure equalizing gas, an evaporator having a low temperature section and a high temperature section, said high temperature section having separated spaces, means to conduct the pressure equalizing gas to one of said separated spaces, thence to the low temperature section, and thence to the other of said separated spaces, means to conduct liquid refrigerant first through said second space and then through the low temperature section, and means to maintain a body of liquid refrigerant in said second space in thermal conductive relation with equalizing gas in said first space.

ALVAR LENNING.